(12) United States Patent
Canavan et al.

(10) Patent No.: US 9,246,807 B2
(45) Date of Patent: *Jan. 26, 2016

(54) METHOD AND APPARATUS FOR PROVIDING ENHANCED SERVICES LOCAL ROUTING

(71) Applicant: AT&T Intellectual Property II, L.P., Atlanta, GA (US)

(72) Inventors: Susan K. Canavan, Mason, OH (US); Christine Holmgren, Little Silver, NJ (US); Andrew P. Jurczak, Pinckney, MI (US); Karen McGregor-Barnes, Manalpan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,709

(22) Filed: Feb. 4, 2014

(65) Prior Publication Data

US 2014/0153564 A1   Jun. 5, 2014

Related U.S. Application Data

(63) Continuation of application No. 11/618,890, filed on Dec. 31, 2006, now Pat. No. 8,660,113.

(51) Int. Cl.
*H04L 12/66* (2006.01)
*H04L 12/741* (2013.01)

(52) U.S. Cl.
CPC ............... *H04L 45/74* (2013.01); *H04L 12/66* (2013.01)

(58) Field of Classification Search
CPC ........................................... H04L 12/66
USPC ............................................. 370/352
See application file for complete search history.

(56) References Cited

U.S. PATENT DOCUMENTS

| | | | |
|---|---|---|---|
| 6,614,781 B1 * | 9/2003 | Elliott et al. ................. | 370/352 |
| 6,961,334 B1 * | 11/2005 | Kaczmarczyk ............... | 370/354 |
| 7,227,941 B2 | 6/2007 | Baumeister et al. | |
| 7,245,609 B2 | 7/2007 | D'Eletto | |
| 7,269,163 B1 | 9/2007 | Koch et al. | |
| 7,277,421 B1 | 10/2007 | Pershan | |
| 7,324,502 B2 | 1/2008 | Sheldon et al. | |
| 7,346,043 B1 | 3/2008 | Olshansky et al. | |
| 7,440,442 B2 | 10/2008 | Grabelsky et al. | |
| 7,483,417 B2 | 1/2009 | Farris et al. | |
| 7,508,816 B1 * | 3/2009 | Everson et al. ............... | 370/352 |
| 8,660,113 B1 | 2/2014 | Canavan et al. | |
| 2002/0141386 A1 * | 10/2002 | Minert et al. ................. | 370/352 |
| 2007/0060133 A1 * | 3/2007 | Spitzer et al. ................. | 455/445 |
| 2007/0133521 A1 | 6/2007 | McMaster | |

(Continued)

*Primary Examiner* — Robert Wilson
*Assistant Examiner* — Nourali Mansoury (57) ABSTRACT

A method and apparatus for enabling a call originated in the VoIP network to be routed from the egress of the VoIP network to the terminating PSTN network using an egress route, such as an appropriate egress access trunk, that is in the same Local Calling Area (LCA) of the called party number are disclosed. This allows the call to be completed to the called party without paying access charge. For example, the method assigns a Billing Telephone Number (BTN) or a Charge Number (CgN) to an egress route between a communication network and a Public Switched Telephone Network (PSTN) network. The method then routes a call originating from the communication network and terminating to the PSTN network using the egress route without incurring an access charge.

9 Claims, 5 Drawing Sheets

(56) References Cited

U.S. PATENT DOCUMENTS

| | | |
|---|---|---|
| 2007/0206568 A1 | 9/2007 | Silver et al. |
| 2007/0206569 A1 | 9/2007 | Silver et al. |
| 2007/0206571 A1 | 9/2007 | Silver |
| 2007/0206572 A1 | 9/2007 | Silver et al. |
| 2007/0206573 A1 | 9/2007 | Silver |
| 2008/0037520 A1 | 2/2008 | Stein et al. |
| 2008/0118049 A1* | 5/2008 | Chang ............... 379/221.13 |

* cited by examiner

METHOD AND APPARATUS FOR PROVIDING ENHANCED SERVICES LOCAL ROUTING

This application is a continuation of U.S. patent application Ser. No. 11/618,890, filed Dec. 31, 2006, now U.S. Pat. No. 8,660,113 B1, and is herein incorporated by reference in its entirety.

The present invention relates generally to communication networks and, more particularly, to a method and apparatus for providing enhanced services local routing in communication networks, e.g., packet networks such as Voice over Internet Protocol (VoIP) networks.

BACKGROUND OF THE INVENTION

Under the Federal Communication Commission (FCC) Enhanced Service Provider (ESP) exemption, a VoIP service provider can benefit from significant savings for call termination to a Public Switched Telephone Network (PSTN). The ESP exemption allows a VoIP service provider to purchase local access service used for terminating local calls without paying an access charge to a Local Exchange Carrier (LEC) rather than long distance access service used for terminating long distance calls which involves paying an access charge to a LEC. Exempted terminating calls originated in a VoIP network are qualified based on the rate center associated with the Primary Rate Interface (PRI) connecting the VoIP provider gateway to the LEC PSTN switch rather than on the location, associated with the calling party phone number, of the VoIP calling party.

Therefore, a need exists for a method and apparatus for enhanced services local routing in a packet network, e.g., a VoIP network, which enables a VoIP service provider to benefit from the FCC ESP exemption.

SUMMARY OF THE INVENTION

In one embodiment, the present invention enables a call originated in the VoIP network to be routed from the egress of the VoIP network to the terminating PSTN network using an egress route, such as an appropriate egress access trunk, that is in the same Local Calling Area (LCA) of the called party number. This allows the call to be completed to the called party without paying access charge. For example, the method assigns a Billing Telephone Number (BTN) or a Charge Number (CgN) to an egress route between a communication network and a Public Switched Telephone Network (PSTN) network. The method then routes a call originating from the communication network and terminating to the PSTN network using the egress route without incurring an access charge.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
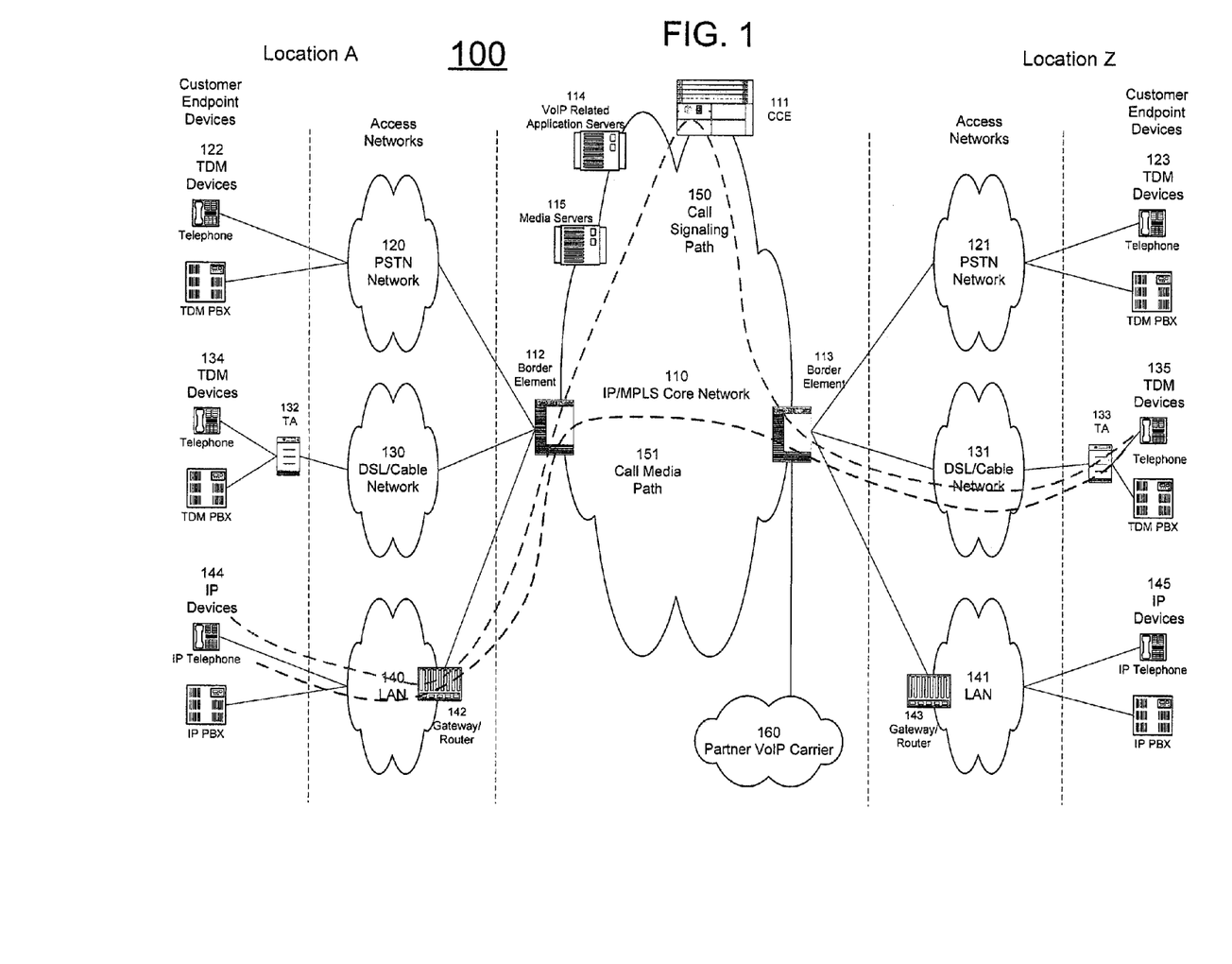
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

In one embodiment TA 132 and 133 could be the customer endpoint devices, which are IP devices, and therefore viewed as IP originations from the customer perspective.

The core VoIP infrastructure comprises of several key VoIP components, such as the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format. Under the Federal Communication Commission (FCC) Enhanced Service Provider (ESP) exemption, a VoIP service provider can benefit from significant savings for call termination to a Public Switched Telephone Network (PSTN). The ESP exemption allows a VoIP service provider to purchase local access service used for terminating local calls without paying an access charge to a Local Exchange Carrier (LEC) rather than long distance access service used for terminating long distance calls which involves paying an access charge to a LEC. Exempted terminating calls originated in a VoIP network are qualified based on the rate center associated with the Primary Rate Interface (PRI) connecting the VoIP provider gateway to the LEC PSTN switch rather than on the location, associated with the calling party phone number, of the VoIP calling party.

An ESP is a company that provides, via a connection to an exchange carrier, services that add value to voice and/or data information. The PSTN is the network of the public circuit-switched telephone networks. ISDN is a set of protocols for digital circuit switching in a circuit-switched telephone network system that enables digital transmission of voice and data. PRI is part of the ISDN standard for carrying multiple voice and data transmission channels as well as the associated control and signaling channel. A LCA is a calling area that comprises a set of NPA and NXX codes in which phone calls made between phone numbers within the comprised set of NPA and NXX codes are considered local calls. NPA (Numbering Plan Area) is the area code, e.g., the most significant 3 digits, of the 10 digit North American Numbering Plan (NANP) phone number. NXX is used to indicate the second group of three digits, e.g., after the 3 digit area code, in a 10-digit NANP telephone number. Technically NXX is a short hand way of indicating a pattern of 3 digits: N means any number 2-9, and X means any number 0-9. Currently, the North American Numbering Plan (NANP) is a telephone numbering plan that uses three-digit area codes and seven-digit telephone numbers.

To address this need, the present invention enables a call originated in the VoIP network to be routed from the egress of the VoIP network to the terminating PSTN network using an egress route, such as an appropriate egress access trunk, with an associated Billing Telephone Number (BTN) or a Charge Number (CgN) that is in the same Local Calling Area (LCA) of the called party number. This allows the call to be completed to the called party without paying access charge as permitted under the FCC ESP exemption. Thus, the present invention minimizes the terminating access costs associated with routing calls originated from a VoIP network to the PSTN. In one embodiment, static routes built between the VoIP network egress and the PSTN are established based on the called party number and the Local Calling Area associated with the called party number.

Normally a call is routed based on classifying the call as intra-LATA local, intra-LATA toll, or inter-LATA using the calling party number and called party number. The present invention allows calls originated from a VoIP network to be routed to the PSTN over local trunks serving the Local Calling Area of the called party number and doesn't require the use of the calling party number. The present invention builds upon the FCC ESP exemption for calls originating in a VoIP network, thereby allowing those calls to be terminated by the PSTN as local calls without paying an access charge to a LEC if they are delivered to the PSTN over access trunks serving the Local Calling Area of the called party number.

Figure 2:
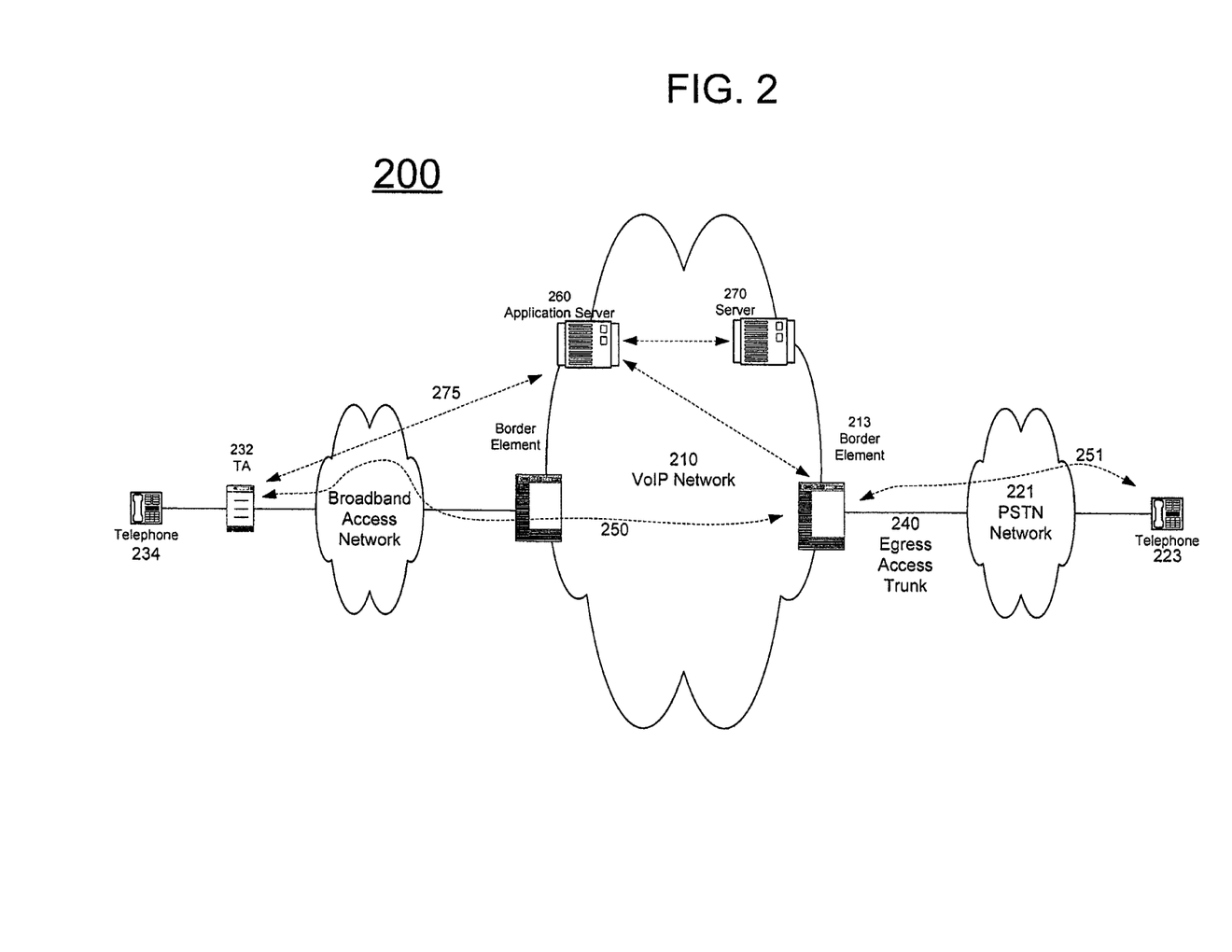
FIG. 2 illustrates an example of enhanced service local routing related to a VoIP network of the present invention.

FIG. 2 illustrates an example 200 of enhanced service local routing related to a VoIP network of the present invention. In FIG. 2, a call is originated using telephone 234 via TA 232. The call is made to telephone 223. TA 232 originates the call using the called party number which is the phone number of telephone 223. Telephone 223 is a PSTN termination supported by PSTN 221. Egress access trunk 240 is built to connect egress BE 213 and a PSTN switch 220 in PSTN 221. A BTN or CgN is assigned and associated with egress access trunk 240. In addition, all NPAs and NXXs that are in the same LCA as the BTN of egress access trunk 240 are also identified and stored in a routing table in BE 213 or in another element such as a separate Server 270. Note also that telephone 223 has an NPA and NXX that belong to the same LCA associated with the BTN of egress access trunk 240.

In order to complete the call to the called party, telephone 223 in this case, VoIP network 210 routes the call, using routing information from Server (e.g. Network Routing Engine or Gateway Controller Function) 270, to BE 213 using signaling flow 250 since BE 213 has been configured to terminate calls destined to the NPA and NXX of the called party number. Note that as another example the call could also progress from the Broadband Access Network to Application Server 260, which could obtain egress routes from Server 270, and route the call to BE 213 using signaling flow 275.

Upon receiving the call setup message, BE 213 completes the call using the called party NPA and NXX to identify the egress access trunk with a BTN that is in the same LCA as the called party NPA and NXX. In this case, egress access trunk 240 is identified by BE 213 for egress routing. Therefore, the call setup message is forwarded by BE 213 to PSTN 221 using egress access trunk 240 to reach telephone 223 using flow 251. Since the BTN or CgN associated with egress access trunk 240 is in the same LCA as the NPA and NXX of the called party number, the call completed using flow 251 is therefore considered a local call and egress access trunk 240 is considered a local access facility from the PSTN perspective. Hence, the local access charge to complete the call has been avoided.

Note that the present invention is media independent and can be applied to egress access trunks using different signaling protocols from the egress edge of the VoIP network to the PSTN. In one embodiment of the invention, egress access trunk 240 may use the Integrated Service Digital Network (ISDN) Primary Rate Interface (PRI) D-channel signaling between VoIP network 210 and PSTN 221. In another embodiment of the invention, egress access trunk 240 may use Signaling System 7 (SS7) signaling between VoIP network 210 and PSTN 221.

Figure 3:
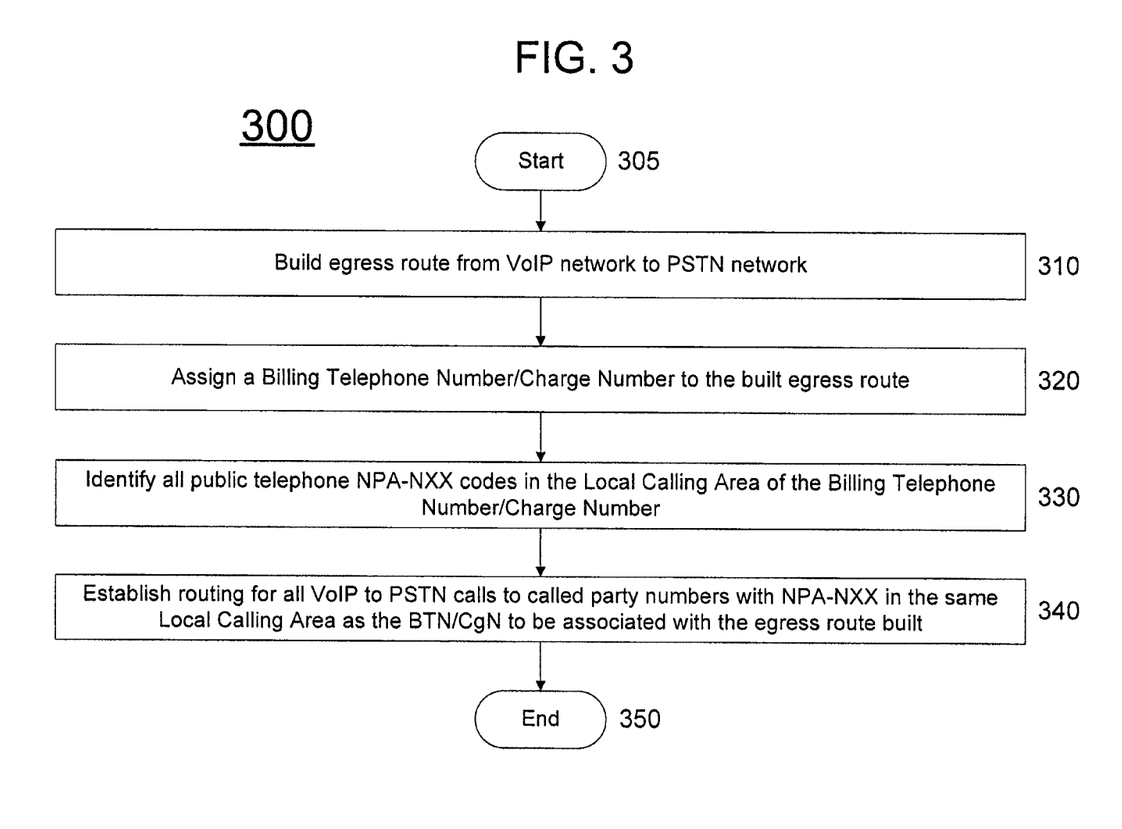
FIG. 3 illustrates a flowchart of a method for enhanced service local routing in a packet network, e.g., a VoIP network, of the present invention.

FIG. 3 illustrates a flowchart of a method 300 for enhanced service local routing in a packet network, e.g., a VoIP network, of the present invention. Method 300 starts in step 305 and proceeds to step 310.

In step 310, the method builds an egress route between the egress edge of a VoIP network and a PSTN network. For instance, an egress access trunk, such as a PRI access trunk, is built to connect between an egress BE and the PSTN of a LEC terminating the call. Both the egress BE and the Server (e.g. Network Routing Engine or Gateway Controller Function) will have knowledge of the trunk.

In step 320, the method assigns a BTN or CgN to the built egress route, e.g., the egress access trunk. For instance, a particular BTN or CgN is assigned to and associated with the built egress route.

In step 330, the method identifies all NPA-NXX codes in the LCA of the BTN or CgN of the built egress route. All NPA-NXX codes that are within the same LCA as the BTN or CgN associated with the built egress route are identified. The LCA is defined by the Local Exchange Routing Guide (LERG).

In step 340, the method establishes a routing entry in the Server (e.g., Network Routing Engine or Gateway Controller Function), where that Server may be separate or part of the egress BE, to route all calls originated from the VoIP network, with the called party number having NPA-NXX in the same LCA of the BTN or CgN of the egress route built in previous steps, to use the built egress route for that particular LCA to hand off the call to the terminating PSTN. When such a call is routed from the VoIP network to the PSTN network, the NPA and NXX of the called party number and the BTN or CgN associated with the built egress route shall be in the same LCA. The method ends in step 350.

Figure 4:
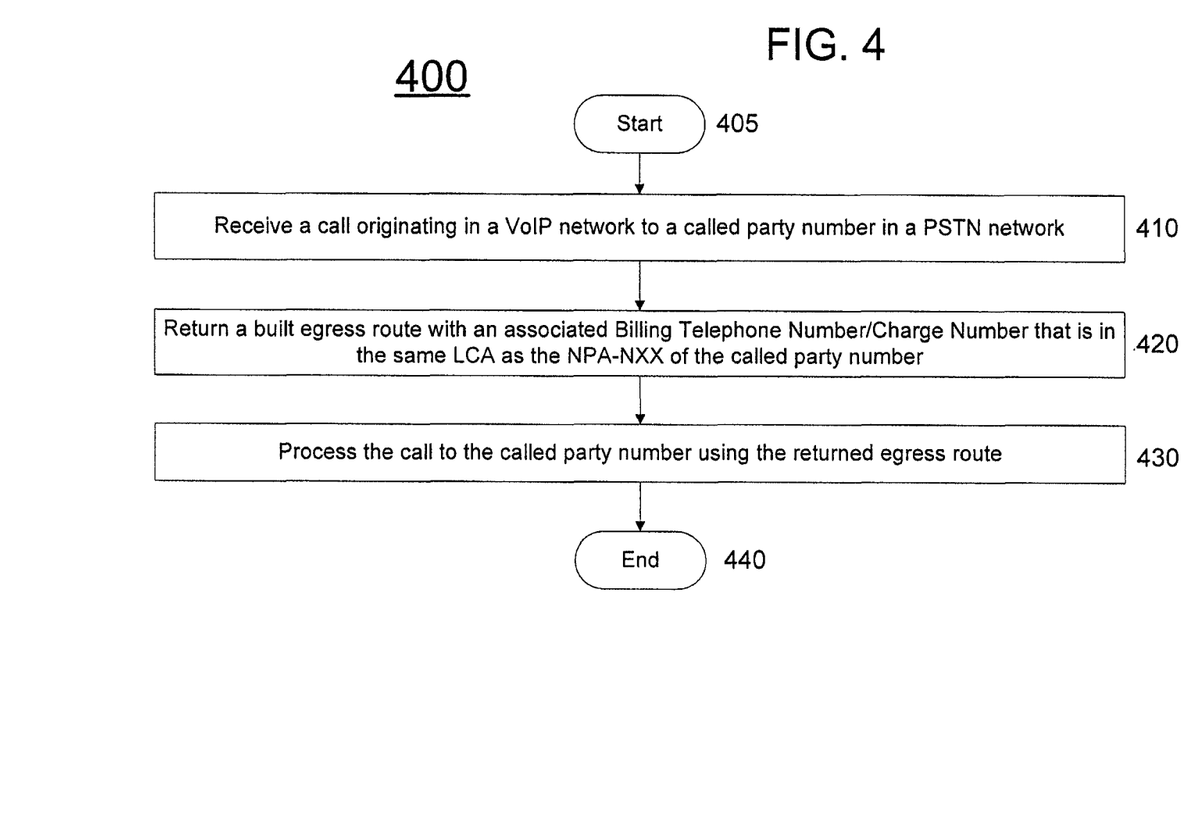
FIG. 4 illustrates a flowchart of a method for terminating an ESP exempt call in a packet network, e.g., a VoIP network, of the present invention.

FIG. 4 illustrates a flowchart of a method for terminating an ESP exempt call in a packet network, e.g., a VoIP network, of the present invention. Method 400 starts in step 405 and proceeds to step 410.

In step 410, the method receives a call originating in a VoIP network to a called party number to be terminated in a PSTN network.

In step 420, the method returns a built egress route with associated BTN or CgN that are in the same LCA as the NPA-NXX of the called party number. In other words, using the NPA and NXX of the called party number, the method returns a built egress route with an associated BTN or CgN that belongs to the same LCA as the NPA and NXX of the called party number.

In step 430, the method processes the call to the called party number using the returned egress route. The method ends in step 440.

Figure 5:
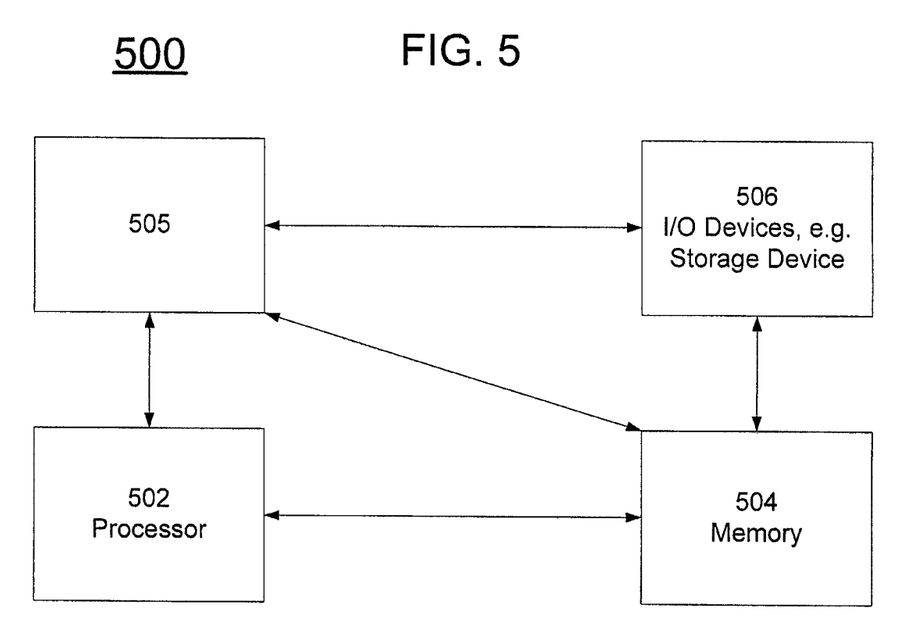
FIG. 5 illustrates a high level block diagram of a general purpose computer suitable for use in performing the functions described herein.

FIG. 5 depicts a high level block diagram 500 of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing enhanced service local routing, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing enhanced service local routing can be loaded into memory 504 and executed by processor 502 to implement the functions as discussed above. As such, the present process 505 for providing enhanced service local routing (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for routing a call, comprising:
assigning, by a processor, a billing number to an access trunk of an egress route between a communication network and a public switched telephone network, wherein the egress route comprises the access trunk connecting between the communication network and the public switched telephone network, wherein the communication network is a packet communication network;
identifying, by the processor, all telephone numbers with numbering plan area and NXX codes that are in a same local calling area as the billing number of the access trunk, wherein the access trunk comprises a signaling system 7 access trunk, wherein the access trunk interconnects an egress border element in the communication network and a public switched telephone network switch in the public switched telephone network, wherein the access trunk serves a called party in the same local calling area as the billing number of the access trunk; and
routing, by the processor, the call originating from the communication network and terminating to the public switched telephone network using the access trunk without incurring an access charge, wherein the routing comprises routing the call having a called telephone number that is deemed local to the numbering plan area and the NXX codes that have been identified.

2. The method of claim 1, wherein the communication network is an internet protocol network.

3. The method of claim 1, wherein the routing comprises:
receiving the call originating in the communication network and terminating to the public switched telephone network; and
identifying the egress route for completing the call using a numbering plan area code and an NXX code of the identified numbering plan area and NXX codes of the called telephone number using an established routing table.

4. A non-transitory computer-readable storage medium storing a plurality of instructions which, when executed by a processor, cause the processor to perform operations for routing a call, the operations comprising:
assigning a billing number to an access trunk of an egress route between a communication network and a public switched telephone network, wherein the egress route comprises the access trunk connecting between the communication network and the public switched telephone network, wherein the communication network is a packet communication network;
identifying all telephone numbers with numbering plan area and NXX codes that are in a same local calling area as the billing number of the access trunk, wherein the access trunk comprises a signaling system 7 access trunk, wherein the access trunk interconnects an egress border element in the communication network and a public switched telephone network switch in the public switched telephone network, wherein the access trunk serves a called party in the same local calling area as the billing number of the access trunk; and
routing the call originating from the communication network and terminating to the public switched telephone network using the access trunk without incurring an access charge, wherein the routing comprises routing the call having a called telephone number that is deemed local to the numbering plan area and the NXX codes that have been identified.

5. The non-transitory computer-readable storage medium of claim 4, wherein the communication network is an internet protocol network.

6. The non-transitory computer-readable storage medium of claim 4, wherein the routing comprises:
receiving the call originating in the communication network and terminating to the public switched telephone network; and
identifying the egress route for completing the call using a numbering plan area code and an NXX code of the identified numbering plan area and NXX codes of the called telephone number using an established routing table.

7. An apparatus for routing a call, comprising:
a processor; and
a non-transitory computer-readable medium storing a plurality of instructions which, when executed by the processor, cause the processor to perform operations, the operations comprising:
assigning a billing number to an access trunk of an egress route between a communication network and a public switched telephone network, wherein the egress route comprises the access trunk connecting between the communication network and the public switched telephone network, wherein the communication network is a packet communication network;
identifying all telephone numbers with numbering plan area and NXX codes that are in a same local calling area as the billing number of the access trunk, wherein the access trunk comprises a signaling system 7 access trunk, wherein the access trunk interconnects an egress border element in the communication network and a public switched telephone network switch in the public switched telephone network, wherein the access trunk serves a called party in the same local calling area as the billing number of the access trunk; and
routing the call originating from the communication network and terminating to the public switched telephone network using the access trunk without incurring an access charge, wherein the routing comprises routing the call having a called telephone number that is deemed local to the numbering plan area and the NXX codes that have been identified.

8. The apparatus of claim 7, wherein the communication network is an internet protocol network.

9. The apparatus of claim 7, wherein the routing comprises:
receiving the call originating in the communication network and terminating to the public switched telephone network; and
identifying the egress route for completing the call using a numbering plan area code and an NXX code of the identified numbering plan area and NXX codes of the called telephone number using an established routing table.

* * * * *